Aug. 20, 1935.   K. F. JUENGLING   2,011,767
HOT GAS VALVE
Filed May 15, 1933    2 Sheets-Sheet 1
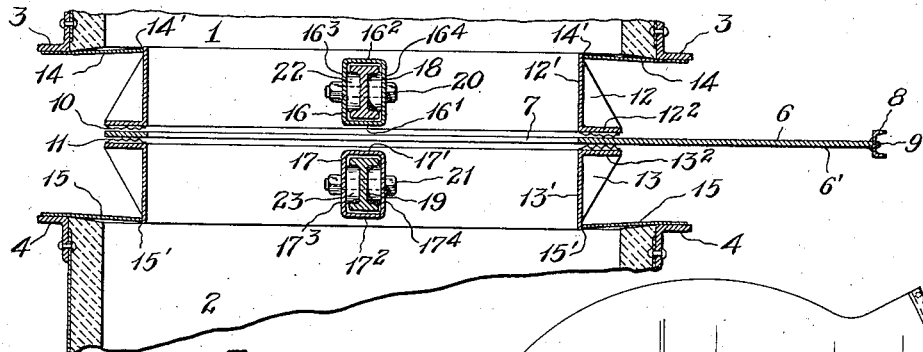
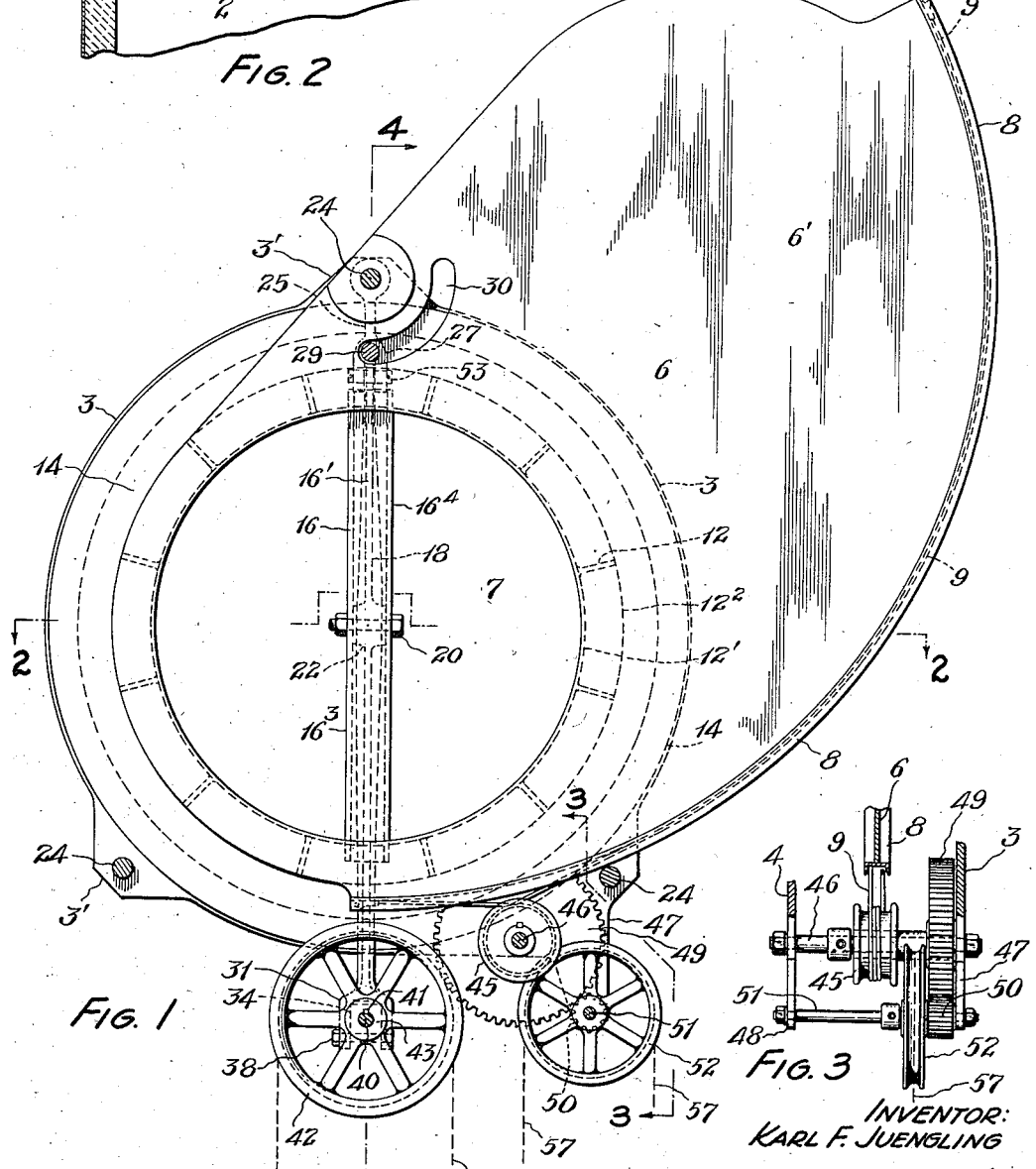
INVENTOR:
KARL F. JUENGLING
By Saywell and Wessler
ATTORNEYS Aug. 20, 1935.  K. F. JUENGLING  2,011,767
HOT GAS VALVE
Filed May 15, 1933   2 Sheets-Sheet 2
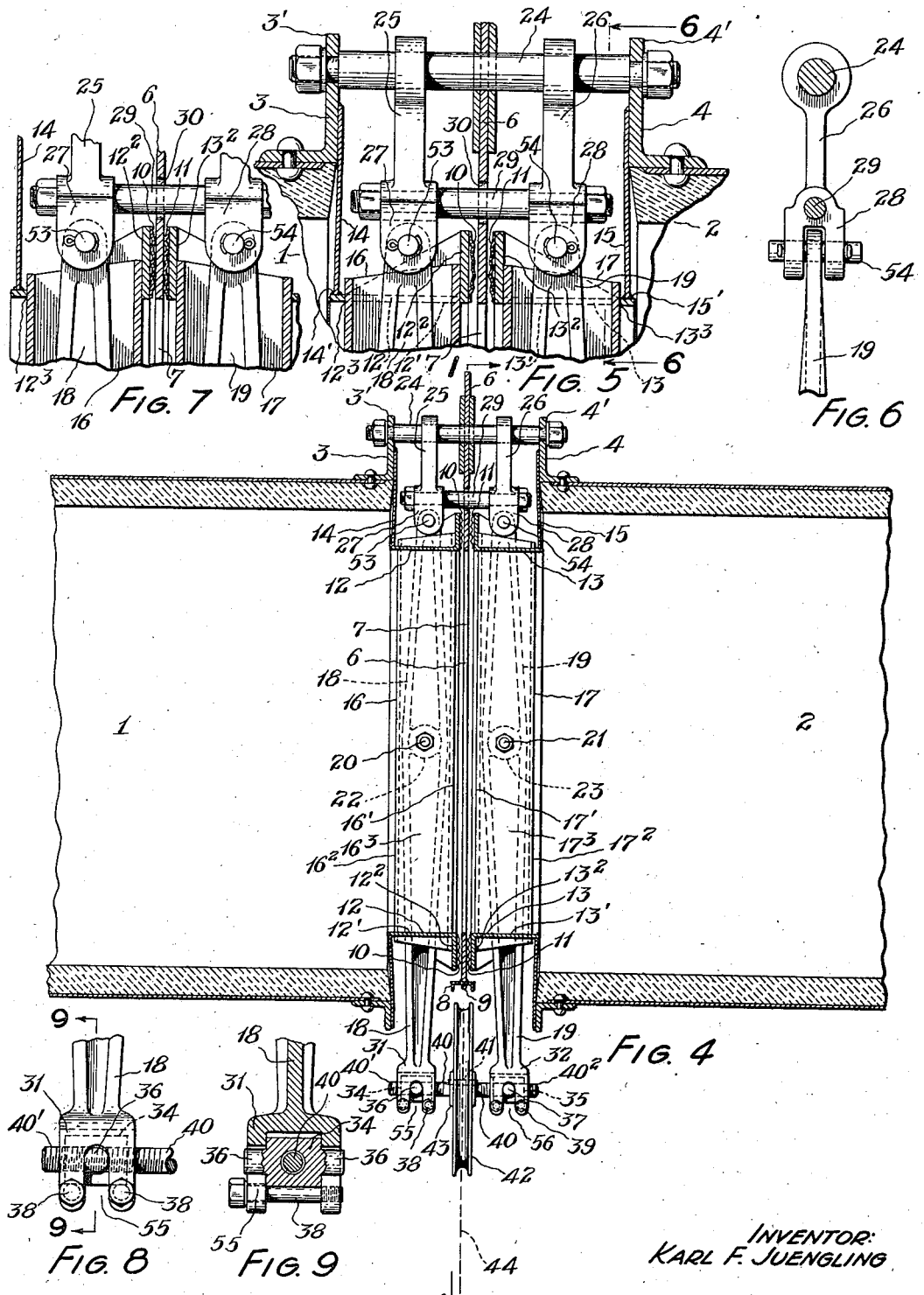
INVENTOR:
KARL F. JUENGLING
By Saywell and Wesseler
ATTORNEYS Patented Aug. 20, 1935

2,011,767

UNITED STATES PATENT OFFICE 2,011,767

HOT GAS VALVE

Karl F. Juengling, Lakewood, Ohio

Application May 15, 1933, Serial No. 671,261

5 Claims. (Cl. 251—167)

The invention particularly relates to improvements in a valve utilized when opening and closing a passage in a hot gas conduit in which the gases derived from gas producers, blast furnaces, and the like, are handled.

The particular objects of the invention are to produce a valve of the character mentioned which is comprised of a comparatively small number of parts, requiring a minimum of manufacturing refinement, and hence of economical manufacture; which can be readily and conveniently assembled; which is easily operated; and which is durable. Other advantages of the improved valve will be clearly evident from the description herein and the accompanying drawings.

The annexed drawings and the following description set forth in detail certain means embodying my invention, such means disclosing, however, but one of the various forms in which the principle of the invention may be applied.

In said annexed drawings:

Figure 1 is a transverse vertical section, taken in the plane indicated by the line 1—1, Figure 4, and showing an end elevation of one of the two component parts of my improved valve assembly, together with a goggle plate in open position so as to permit passage of gas between the conduit sections which the goggle plate controls, the view also showing an elevation of certain actuating mechanism for controlling the opening and closing movements of the goggle plate, and certain actuating mechanism for controlling the seating and unseating upon opposite sides of the goggle plate of seat members whose positions determine whether the goggle plate is sealed gas tight or is released so as to permit the desired opening or closing movement of the goggle plate;

Figure 2 is a plan section of my improved valve, taken in the planes indicated by the line 2—2, Figure 1, and showing the two component valve parts secured respectively to the spaced ends of two adjacent gas conduit sections of which fragmentary portions are shown;

Figure 3 is a detail of certain actuating mechanism for controlling the movements of the goggle plate, the view being taken in the planes indicated by the line 3—3, Figure 1;

Figure 4 is a longitudinal vertical section, taken in the plane indicated by the line 4—4, Figure 1;

Figure 5 is an enlarged fragmentary view of certain valve elements shown in Figure 4, the lower part of the view being taken in a different plane than the corresponding part of Figure 4 in order better to show the elements adapted to be seated against or unseated from the goggle plate, and means directly acting upon such elements to move them, these elements in this view being shown in their unseated position;

Figure 6 is a fragmentary transverse vertical section, taken in the plane indicated by the line 6—6, Figure 5;

Figure 7 is a view similar to a portion of Figure 5 and in which the seating elements are shown in their closed position against the goggle plate;

Figure 8 is an enlarged fragmentary view of a part of the actuating elements shown in Figure 4 adapted to effect the seating or unseating of the sealing elements upon or from the goggle plate; and Figure 9 is a transverse vertical section, taken in the plane indicated by the line 9—9, Figure 8.

Referring to the annexed drawings in which the same parts are indicated by the same respective numbers in the several views, the ends of two gas conduit sections 1 and 2 are provided with respective annular angles 3 and 4 one leg of each of which is rigidly secured to one of the conduit sections 1 and 2 and adjacent the ends of the latter, the other legs of the angles 3 and 4 extending outwardly from the conduit sections 1 and 2 and substantially perpendicular to the axis of the latter. These annular angles 3 and 4 form supports for my improved hot gas valve which is disposed in the open transverse slot defined by the spaced ends of the conduit sections 1 and 2. The two angles 3 and 4 are rigidly held in alined spaced relation by means of spaced bolts 24 which are fastened in outwardly extended ears 3' and 4' formed upon the angles 3 and 4.

Rigidly secured by their outer edge portions to the opposed faces of the outwardly extended legs of the angles 3 and 4 are a pair of annular flexible diaphragms 14 and 15 which extend inwardly of the slot defined by the conduit sections 1 and 2. Rigidly secured to the inner edges of these diaphragms 14 and 15 are a pair of annular angles 12 and 13 having each a longitudinally extending leg 12' or 13', and an outwardly and tranversely extending leg $12^2$ or $13^2$, the legs $12^2$ and $13^2$ facing each other longitudinally of the conduits 1 and 2 and being so spaced one from the other as to form between them a transverse slot suitable for receiving opposed seats 10 and 11 formed upon or provided upon the angle legs $12^2$ and $13^2$. The seats 10 and 11 are adapted to contact with the opposite sides of a dependingly supported and swinging goggle plate 6 tightly to seal the joint between the conduit sections 1 and 2, or to be released from said plate 6 so as to permit the latter to be moved into and out of sealing position. The securing of the inner edges of the diaphragms 14 and 15 to the annular angles 12 and 13 may be effected in any desired manner and I show such connections in the accompanying drawings, for purposes of illustration, as being welded joints 14' and 15'. Plate 6 is formed adjacent one end with a circular hole 7 of a size suitable to provide for the passage of gas between conduit sections 1 and 2 and adjacent the opposite end with an imperforate part 6' adapted to close the opening between the conduit sections 1 and 2. The goggle plate 6 is formed with a peripheral channel portion 8 adapted to receive a chain or cable 9, by the winding and unwinding of which by means hereinafter fully described, the goggle plate 6 can be moved to sealing and unsealing positions.

For purpose of illustration, but without committing myself thereto, I show valve seats 10 and 11 which are of corrugated formation. However, any other suitable form or arrangement of seat construction would serve.

It is evident that by reason of the flexibility of the inwardly-extended portions of the diaphragms 14 and 15, and the spacing of the seats 10 and 11, if means are provided for moving the annular angles 12 and 13 longitudinally to and from each other, the seats 10 and 11 can be brought into seating contact with the goggle plate 6, or can be more widely spaced one from the other to release the goggle plate 6 and permit its being moved from one position to the other. It is also evident that by reason of the flexible diaphragm construction, limited relative axial movement of the conduit ends is permitted without affecting the non-leaking sealing engagement of the plate 6 and the seats 10 and 11.

The means which are provided for moving the annular angles 12 and 13 consist of diametrically arranged and laterally closed open-ended housings 16 and 17 which are disposed across the circular openings in the annular angles 12 and 13 and extend through diametrically opposed holes 12³ and 13³ formed in the longitudinal legs 12' and 13' of the angles 12 and 13, respectively. The housings 16 and 17 are tightly secured at their ends in the longitudinal legs 12' and 13' respectively of the angles 12 and 13. Extending through the housings 16 and 17, respectively, are levers 18 and 19 of I-cross section which are formed centrally of their lengths with hub portions 22 and 23, respectively, which are secured in the side plates 16³ and 16⁴ and 17³ and 17⁴ respectively of the housings 16 and 17 by means of bolts 20 and 21 respectively. These I-shaped levers 18 and 19 taper from the central hubs 22 and 23 toward their ends and are journaled at their upper ends upon pins 53 and 54 mounted in the clevis-shaped ends 27 and 28 of hangers 25 and 26, respectively, depending from the upper of the three bolts 24 which connect together the support angles 3 and 4. As is clearly evident in Figure 5, the goggle plate 6 is pivotally supported from the same bolt 24 and is formed with an arcuate slot 30 permitting its movement by an intersecting bolt 29 which rigidly secures together the two hangers 25 and 26 adjacent the respective clevis portions 27 and 28 thereof.

By reason of providing the transversely or laterally closed housings 16 and 17 within the open slot formed between the conduit ends 1 and 2, and locating the levers 18 and 19 in the respective housings 16 and 17, which levers are secured centrally of their ends to the respective housings, I am enabled to obtain a uniform pinching action applied upon both sides of the seats 10 and 11, similarly to the action of a nut cracker, without exerting any harmful thrust upon the pipe ends 1 and 2 and without exposing the levers 18 and 19 to the direct deleterious action of the hot gas. The levers 18 and 19 are entirely laterally enclosed within the open-ended housings 16 and 17.

In order to effect swinging movement of the levers 18 and 19 upon the pins 53 and 54 thus to effect through the medium of the hub members 22 and 23 the movement of the housings 16 and 17, and hence of the angles 12 and 13, to and from each other, I form the bottom portions of the levers 18 and 19 with clevis parts 31 and 32, respectively, within which are fastened blocks 34 and 35 held against longitudinal movement by trunnions 36 and 37, respectively, formed therewith, which trunnions are positioned in the upper ends of open-bottom slots 55 and 56 formed between the two longitudinally opposed side members of the clevises 31 and 32, each of these side members in turn being bifurcated and having their respective parts rigidly fastened together by means of bolts 38 and 39, respectively. The blocks 34 and 35 rest upon the respective pairs of bolts 38 and 39, as is clearly shown in Figures 4 and 9, these bolts being applied after the blocks 34 and 35 are positioned in the clevises 31 and 32. Engaging with internal screw threads formed in the blocks 34 and 35 is an elongated screw 40 having respective end portions 40' and 40² one of which is formed with a right-hand thread and the other with a left-hand thread. To the central unthreaded portion of the screw 40 is secured a sheave or chain wheel 42 by means of a hub portion 43 thereof and a key 41, this pulley 42 being grooved for the reception of an operating chain 44.

It is evident from the aforegoing description and by reference to the accompanying drawings that the actuation of the chain wheel 42 in one direction will result in the movement toward each other of the lower clevis portions 31 and 32 formed upon the bottom ends of the levers 18 and 19, and that the actuation of the wheel 42 in the opposite direction will result in the movement of said clevises 31 and 32 away from each other. Any movement of the clevises 31 and 32 and hence of the levers 18 and 19 results in a movement toward or from each other of the housings 16 and 17, by reason of the connection of the lever hubs 22 and 23 therewith, and hence results in a movement of the angles 12 and 13 toward or from each other, and hence a movement of the seats 10 and 11 toward or from each other. Thus the seats 10 and 11 can be tightly secured to the plate 6 for effective sealing of the transverse slot between the conduit ends 1 and 2 or can be released from the plate 6 to permit the latter to be moved into its other position.

The thrust applied to the housings 16 and 17 by the levers 18 and 19 is applied centrally of the transverse slot between the conduit sections 1 and 2 and substantially in the axis of the conduit. This thrust is equally applied to diametrically opposite portions of the angles 12 and 13 by the end portions of the housings 16 and 17. Hence a uniform seating of the elements 10 and 11 results throughout their entire annular formation.

Any suitable mechanism may be provided for effecting the swinging movements of the goggle plate 6. For this purpose I show support plates 47 and 48 suitably secured to the angles 3 and 4. Rods 46 and 51 are supported by the plates 47 and 48, the rod 46 carrying a drum 45 about which is adapted to be wound the cable 9 whose one end is connected to the upper end of the channel 8 formed upon the periphery of plate 6 and whose other end is connected to the lower end of channel 8. The rod 46 also carries a comparatively large gear 49 on whose hub the drum 45 is fixedly mounted and which meshes with a pinion 50 loosely mounted on the rod 51. Rod 51 also loosely carries a chain wheel 52 secured to the pinion 50 and having a groove for the travel of a chain 57 by means of which the wheel 52 can be rotated to effect the movement at proper speed and in the proper direction of the plate 6 through the medium of the pinion 50, gear 49 and drum 45.

What I claim is:

1. A hot gas valve for alined ends of coaxial conduits defining a transverse slot comprising a pair of annular members provided with opposed annular seats, means for flexibly securing said members to the respective conduit ends, a pair of housings supported by, and diametrically disposed relatively to, said annular members and contacting at both ends said annular members respectively to move the latter toward and from each other, actuating levers contained within said respective housings and secured to the latter centrally of said annular seats, and means for moving said levers.

2. A hot gas valve for alined ends of coaxial conduits defining a transverse slot comprising supports adapted to be secured to the respective conduit ends, spaced opposed annular flexible diaphragms secured to said supports and extended inwardly of the latter, annular opposed angles secured to said diaphragms and having longitudinally disposed legs and outwardly extended transverse legs provided with opposed spaced seats, each of said angles having a pair of diametrically opposed openings through the longitudinal leg thereof, a pair of housings diametrically arranged relatively to said angles and extended at their ends through the openings in the respective angles, said housings each contacting their respective angles closely upon opposed longitudinally spaced sides of the housings and actuating means for moving said housings in opposite directions said actuating means exerting a rectilinear thrust upon said housings.

3. A hot gas valve comprising an annular member formed with a seat and having flexible supporting means, a transverse housing fixed at its ends to said member, a transverse actuating lever contained within the housing and secured to the latter centrally of the ends of the housing, and means for moving the lever to exert a rectilinear thrust upon the housing.

4. The combination with a pair of longitudinally-spaced aligned conduit ends defining an open transverse slot therebetween; a pair of transverse annular members flexibly supported from the respective conduit ends and provided with longitudinally-opposed annular seats, a plate between the seats, means for moving the plate transversely, and means for moving the annular members longitudinally relatively to each other, said moving means including a pair of laterally closed and open-ended structures disposed in the open slot and respectively connected to the annular members, thrust means disposed within the respective structures, and means for causing said thrust means to exert a rectilinear thrust upon the structures substantially centrally of the annular seats.

5. A hot gas valve for aligned ends of coaxial conduits defining a transverse slot comprising a pair of annular members provided with opposed annular seats, annular flexible supporting means secured to each of said members and extended outwardly therefrom, diametrically arranged housings fixed at their ends to said members, respectively, transverse actuating levers secured within and to the housings, respectively, and means for moving the levers.

KARL F. JUENGLING.